(12) United States Patent
Tarumi (10) Patent No.: US 10,069,993 B2
(45) Date of Patent: Sep. 4, 2018

(54) RESOURCE MANAGEMENT APPARATUS, RESOURCE MANAGEMENT METHOD AND IMAGE FORMING APPARATUS

(71) Applicant: CANON KABUSHIKI KAISHA, Tokyo (JP)

(72) Inventor: Takeshi Tarumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/204,080

(22) Filed: Jul. 7, 2016

(65) Prior Publication Data

US 2017/0026535 A1 Jan. 26, 2017

(30) Foreign Application Priority Data

Jul. 22, 2015 (JP) ................................. 2015-145251

(51) Int. Cl.
| | |
|---|---|
| H04N 1/00 | (2006.01) |
| H04W 72/10 | (2009.01) |
| H04N 1/21 | (2006.01) |
| H04L 12/927 | (2013.01) |

(52) U.S. Cl.
CPC ....... *H04N 1/00954* (2013.01); *H04L 47/808* (2013.01); *H04N 1/00923* (2013.01); *H04N 1/00941* (2013.01); *H04N 1/21* (2013.01); *H04N 2201/0094* (2013.01)

(58) Field of Classification Search
CPC ........... H04N 1/00954; H04N 1/00923; H04N 1/00941; H04N 1/21; H04N 2201/0094; H04L 47/808
See application file for complete search history.

(56) References Cited

U.S. PATENT DOCUMENTS

| | | | | |
|---|---|---|---|---|
| 6,671,065 | B1* | 12/2003 | Salgado ................ | G06F 9/5011 358/1.15 |
| 2002/0010771 | A1* | 1/2002 | Mandato ............. | H04L 12/5695 709/223 |
| 2003/0035142 | A1* | 2/2003 | Kizaki ............... | H04N 1/00915 358/1.16 |
| 2011/0202928 | A1* | 8/2011 | Nakano ................ | G06F 9/5011 718/104 |

(Continued)

FOREIGN PATENT DOCUMENTS

JP 2007-323393 A 12/2007

*Primary Examiner* — Iriana Cruz
(74) *Attorney, Agent, or Firm* — Fitzpatrick, Cella, Harper & Scinto (57) ABSTRACT

The present invention provides a resource management apparatus that comprises a unit configured to obtain upper-limit values of resource usage amounts of applications in executable state; and a unit configured to allocate a requested resource in relation to a resource obtainment request received from a sender application if a sum total of the upper-limit values does not exceed a resource amount that can be allocated to the applications or an resource amount requested by the resource obtainment request does not exceed a reference value, and cause the resource obtainment request to wait and request an application that is not the sender application to release a resource if the sum total of the upper-limit values exceeds the resource amount that can be allocated to the applications and the resource amount requested by the resource obtainment request exceeds the reference value.

7 Claims, 9 Drawing Sheets

(56) References Cited

U.S. PATENT DOCUMENTS

2015/0268830 A1* 9/2015 Martynov ................ G09G 3/20
                                                    715/766
2016/0337330 A1* 11/2016 Chung .................... H04L 63/20

* cited by examiner

RESOURCE MANAGEMENT APPARATUS, RESOURCE MANAGEMENT METHOD AND IMAGE FORMING APPARATUS

BACKGROUND OF THE INVENTION

Field of the Invention

The present invention relates to a resource management apparatus, a resource management method, an image forming apparatus and a program for managing a usage amount of a resource that an application uses in an execution environment in which a plurality of embedded applications, for example, are installed and executed.

Description of the Related Art

In an embedded application execution environment, typically there is a restriction on a total amount of resources that an application can use, and it depends on a resource amount of an information device. Thus, by defining an upper-limit value for a resource amount used by an application, and confirming that a usage amount of a resource of the application does not exceed the upper-limit value in an inspection stage of the application, stable operation of the application is ensured. In addition, in an embedded application execution environment that assumes that a plurality of such applications are caused to operate, an application management framework is present. The application management framework controls permission or prohibition of an installation such that the total amount of a resource amount used by an application does not exceed a resource amount of the information device. This kind of resource management apparatus and resource management method, which arrange a restriction to the number of applications that can be installed in accordance with a resource amount, are commonly provided.

In contrast, a technique that does not restrict installation of an application, but performs control of a usage amount of a resource when an application is operating has been provided (for example, refer to Japanese Patent Laid-Open No. 2007-323393). In this technique, a state in which applications are in contention is detected, and by controlling them, resource contention among a plurality of applications is controlled. In such a case, because there are restrictions on a resource amount of an information processing apparatus or a resource amount of a system, if an application has requested a resource for which a restriction is exceeded, the application cannot secure the resource immediately and processing proceeds in error, or the application waits for the release of a resource that has been secured by another application.

As a result, the application cannot continue normal operation, and processing by the application is delayed, leading to the occurrence of a phenomenon such as a response of a user interface that is operated by a user becoming sluggish, or delay of a job execution occurring, for example. A delay of processing related to a user operation may lead a loss in the reliability of an entire system. In other words, from the viewpoint of usability, and the like, there are applications for which preferential operation is necessary. Even with such an application, there is a problem in that the operation waits due to a resource deficiency as previously described.

SUMMARY OF THE INVENTION

The present invention causes an application for which preferential operation is necessary to operate without waiting.

According to one aspect of the present invention, there is provided a resource management apparatus for managing resources used by a plurality of applications, the apparatus comprising: an obtaining unit configured to obtain upper-limit values of resource usage amounts of applications in executable state; and an allocation unit configured to allocate a requested resource in relation to a resource obtainment request received from a sender application if a sum total of the upper-limit values is less than or equal to a resource amount that can be allocated to the applications or an resource amount requested by the resource obtainment request is less than or equal to a reference value, and cause the resource obtainment request to wait and request an application that is not the sender application to release a resource if the sum total of the upper-limit values exceeds the resource amount that can be allocated to the applications and the resource amount requested by the resource obtainment request exceeds the reference value.

According to another aspect of the present invention, there is provided an image forming apparatus capable of executing a plurality of applications, the apparatus comprising: an obtaining unit configured to obtain upper-limit values of resource usage amounts of applications in executable state; and an allocation unit configured to allocate a requested resource in relation to a resource obtainment request received from a sender application if a sum total of the upper-limit values is less than or equal to a resource amount that can be allocated to the applications or an resource amount requested by the resource obtainment request is less than or equal to a reference value, and cause the resource obtainment request to wait and request an application that is not the sender application to release a resource if the sum total of the upper-limit values exceeds the resource amount that can be allocated to the applications and the resource amount requested by the resource obtainment request exceeds the reference value; and a unit configured to execute the application, which uses the resource allocated by the allocation unit.

By the present invention, it is possible to provide a resource management apparatus, a resource management method, an image forming apparatus, and a program that preferentially provide resources to and enable operation without delay for an application with a high priority.

Further features of the present invention will become apparent from the following description of exemplary embodiments with reference to the attached drawings.

DESCRIPTION OF THE EMBODIMENTS

<System Configuration Common in Embodiments>

Figure 1:
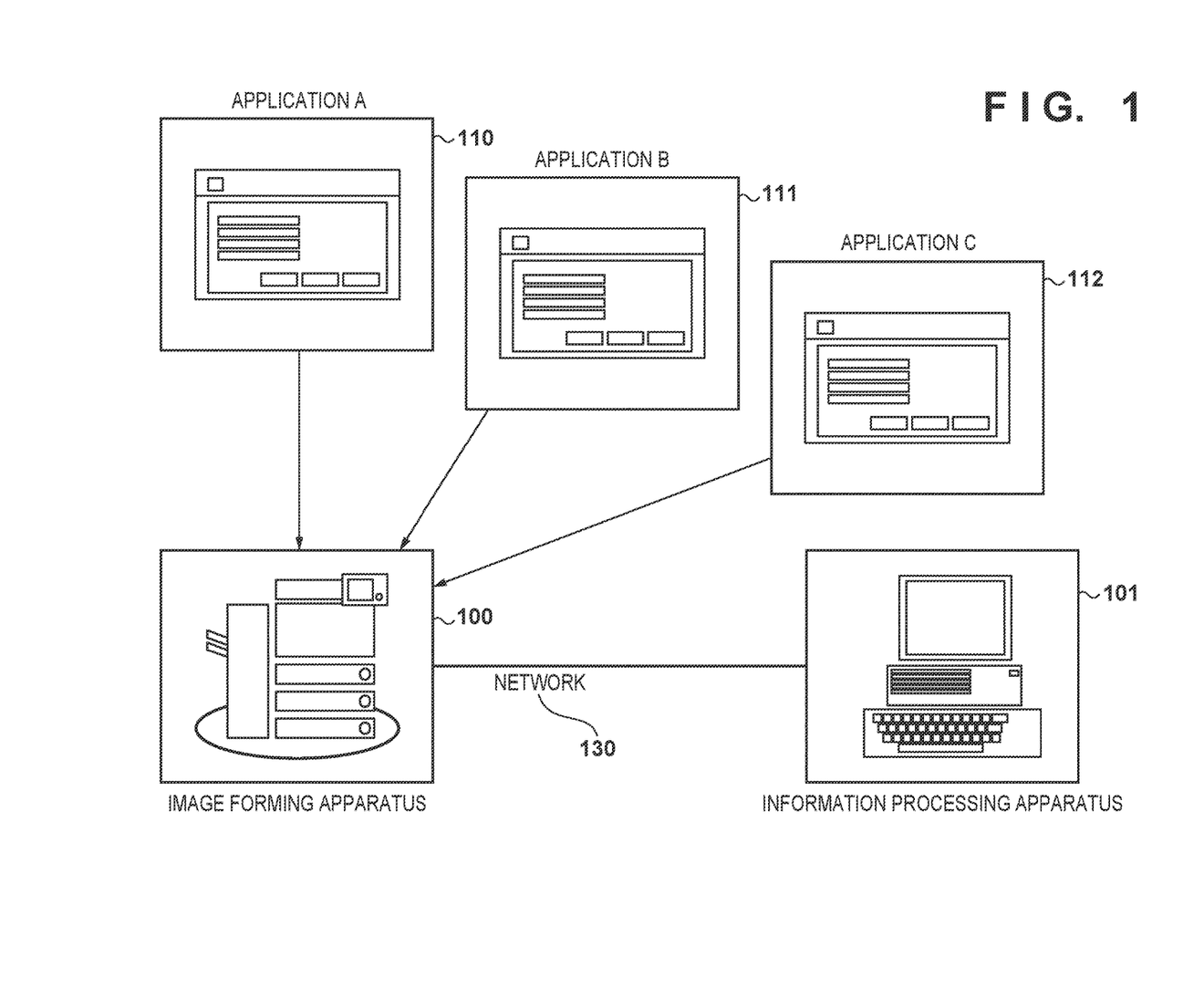
FIG. 1 is a view that illustrates an example of an overall configuration of the present invention.

Hereinafter, embodiments for working the present invention are explained using drawings. FIG. 1 is a view illustrates an example of an overall configuration common to first through third embodiments of the present invention. Reference numeral 100 is an image forming apparatus, such as a multifunction peripheral (MFP) for example, that functions as a resource management apparatus of the present embodiment. A function as a resource management apparatus is realized by an information processing apparatus configuration that the image forming apparatus has. Reference numeral 101 indicates an information processing apparatus, such as a personal computer, and reference numeral 130 indicates a network. The image forming apparatus 100 is connected to the information processing apparatus 101 via the network 130. An application A 110, an application B 111, and an application C 112 each indicate an application program that operates on the image forming apparatus 100 (hereinafter, referred to as an application or an app). It is possible to cause one or a plurality of applications to operate on the image forming apparatus 100. Three applications are exemplified in FIG. 1. A general user and an administrator are provided with basic function of the image forming apparatus 100; applications 110, 111 and 112; as well as means for managing the image forming apparatus 100 and applications. The user can directly operate the image forming apparatus 100, or operate the information processing apparatus 101 via the network 130.

<Configuration of Image Forming Apparatus Common to Embodiments>

Figure 2:
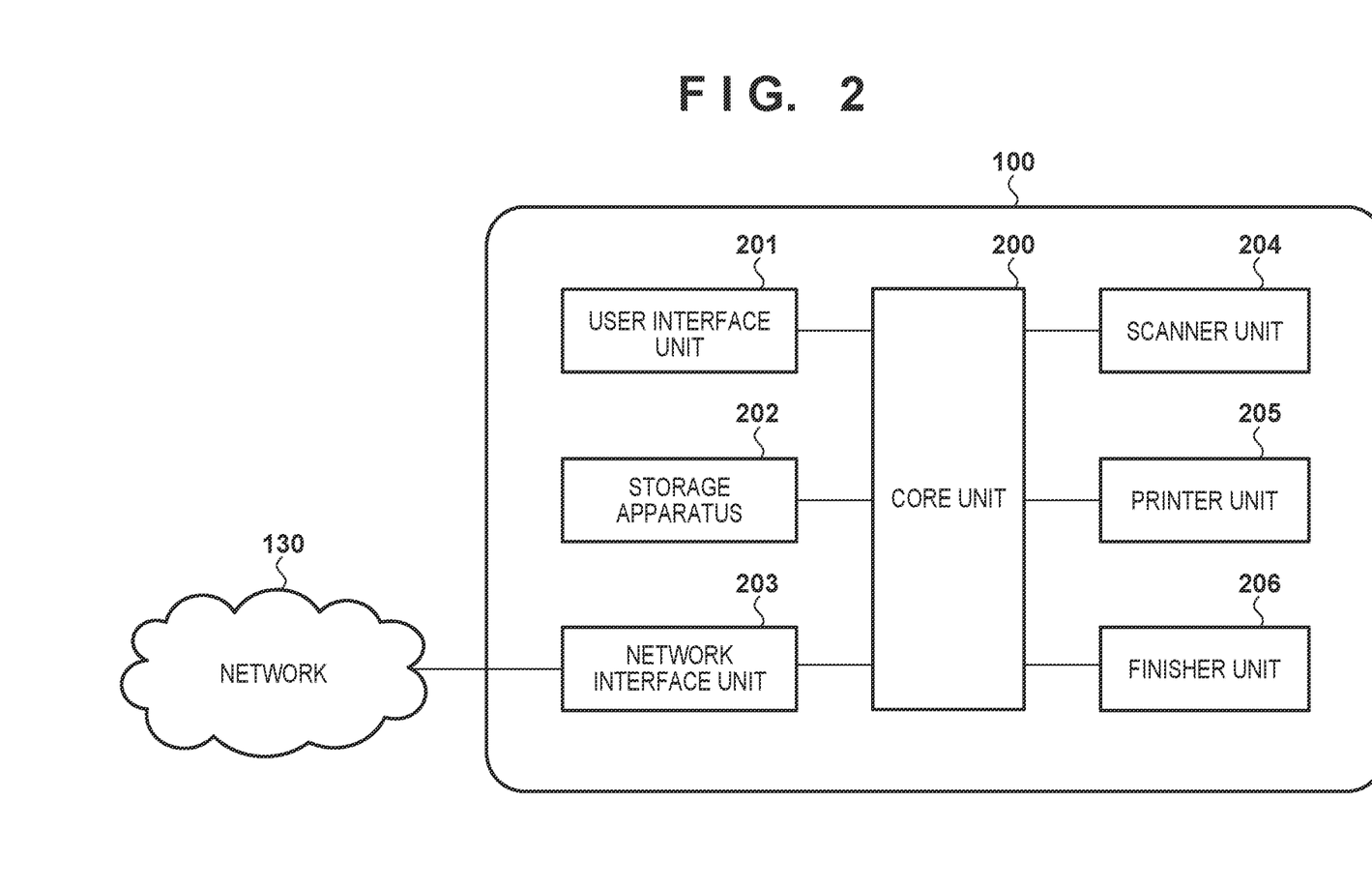
FIG. 2 is a view that illustrates an example of a hardware configuration of an image forming apparatus of the present invention.

FIG. 2 is a view that illustrates an example of a hardware configuration of the image forming apparatus 100. The image forming apparatus has a core unit 200 having a function for processing information by a processor and a memory or the like, a user interface unit 201 having a display function and a key input and/or a touch input function, a storage apparatus unit 202 such as a file storage, a network interface unit 203, a scanner unit 204, a printer unit 205, and a finisher unit 206. An installed application is stored in an executable form in a non-volatile memory or the like that the storage apparatus 202 or the core unit 200 has, and when executed is, for example, loaded into a RAM or the like that the core unit 200 has, and executed directly by the processor (CPU) or by using an interpreter. At a time of execution of an application, resources are secured as necessary as explained in each embodiment to ensure smooth execution.

<Application Execution Environment Common to Embodiments>

Figure 3:
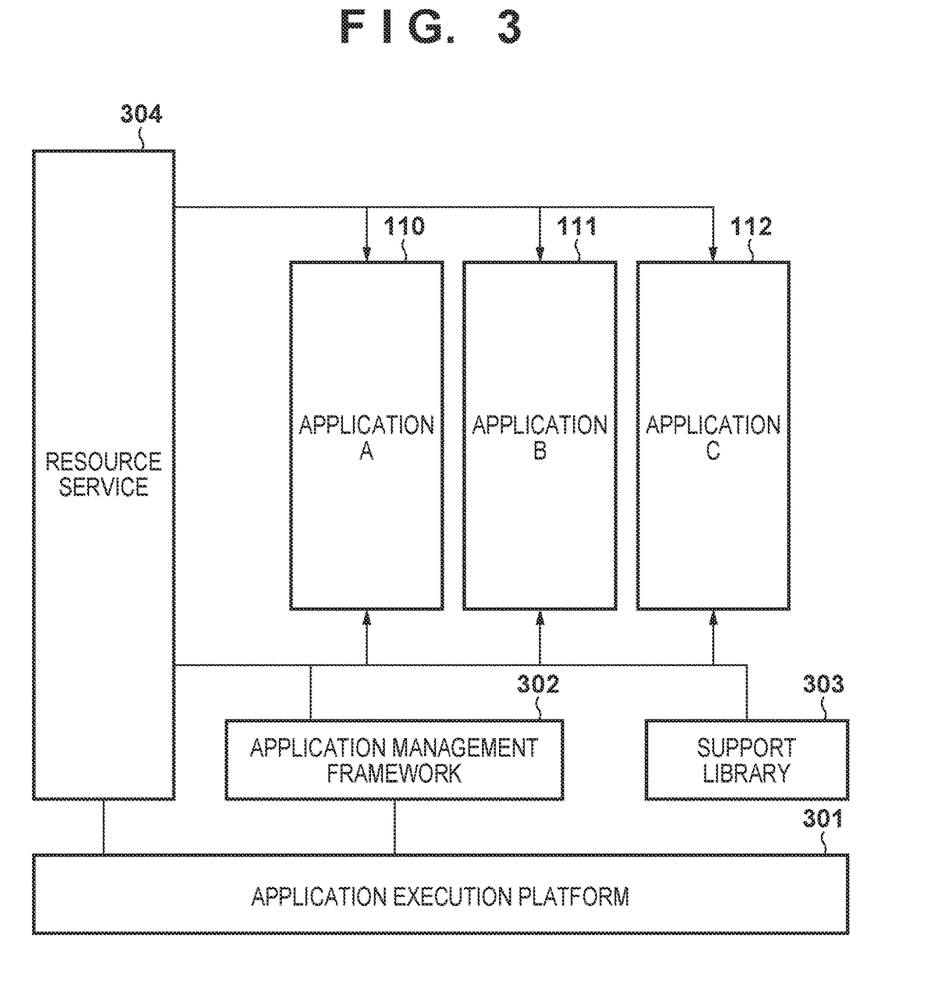
FIG. 3 is a view that illustrates an example of a configuration of an application execution environment of embodiments of the present invention.

FIG. 3 is a view illustrating an example of an execution environment, which is common to each embodiment, for executing each of the applications 110, 111 and 112 in the image forming apparatus. Reference numeral 301 is an application execution platform, and is a Java (registered trademark) virtual machine (Java VM) or the like, for example. If the application execution platform 301 is a Java VM, an application is a Java (registered trademark) program. The application is generally operated on the application execution platform 301. Processing such as the installation, uninstallation, execution and stopping of the applications 110, 111 and 112 is managed by an application management framework 302, which operates on an execution platform 301. Typically, an application management framework is used by an administrator of an image forming apparatus or a system. When performing processing such as installation, the application management framework refers to an application resource upper-limit declaration file 402 (refer to FIG. 4A and FIG. 4B) of the application, and determines whether resource upper-limit values 414 declared in the file fit in current available space of resources in the application execution environment. Processing such as execution of an install process or returning an error (notifying an operator) is performed in accordance with the result of the determination. The application management framework 302 is, for example, an OSGi (Open Services Gateway initiative) framework based on Java (registered trademark). If the application management framework 302 is OSGi, an application is realized by a program called a bundle.

Reference numeral 303 denotes a support library for the applications 110, 111 and 112 to use various functions of the image forming apparatus 100. Reference numeral 304 denotes a resource service used to realize management for resources necessary for an application. As a function of the resource service 304, there is a function for performing management of resources that the applications 110, 111 and 112 use.

The function of managing resources by the resource service 304 is explained. A typical application transmits a resource obtainment request to the application execution platform 301 when securing resources used by the application. A response is received from the application execution platform 301, and processing is performed. When releasing a secured resource, the application similarly transmits a resource release request to the application execution platform 301.

In contrast to this, the resource service 304 implements APIs that are provided to other applications, and an application that supports the resource service calls these APIs to perform obtainment, release, and usage of a resource. The applications 110, 111 and 112, which support the resource service 304, transmit a resource obtainment request or a resource release request to the resource service 304 when securing a resource to use or releasing a secured resource. Having received the request, the resource service 304 obtains an upper-limit value of the usage amount of the resource, which is set for each application. If the resource amount used by the application has not reached the upper-limit value, the resource service 304 transmits a resource obtainment request to the application execution platform 301. The resource service 304 allocates a secured resource to the applications 110, 111 and 112 (the request sender) and returns a response. Resources that are managed by the resource service 304 are, for example, storage, a socket as a communication resource, a thread as a computing resource, memory, or the like. Of course resources other than these are included in what may be managed.

The resource service 304 manages a resource amount used by each application by recording requests to obtain and release by each application. In the present explanation, in response to a request from an application, the resource service 304 was assumed to secure and allocate a resource from the application execution platform 301. Regarding processing for the actual securing of a resource, in response to a request from the application, the resource service 304 returns as a response either permission or refusal for securing of the resource. Resource management is also possible by processing such as the application itself securing resources from the application execution platform 301 in accordance with the response.

<Application Configuration>

Figure 4A:
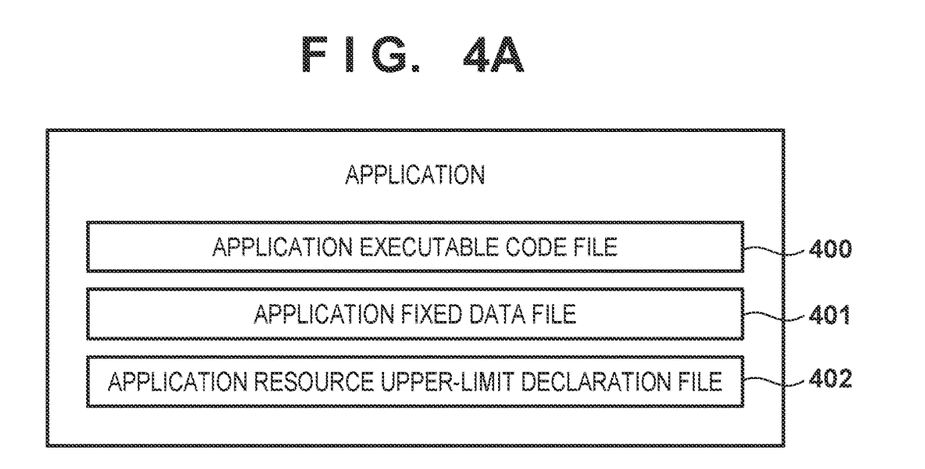
FIG. 4A and FIG. 4B are views that illustrates an example of an application file configuration of embodiments of the present invention.

FIG. 4A is a view that illustrates representative files that configure the applications 110, 111 and 112 in the present embodiment. The applications 110, 111 and 112 have several types of files. Reference numeral 400 denotes an application executable code file that includes, for example, executable code of an application. Reference numeral 401 indicates an application fixed data file that holds fixed data, such as a character sequence or a constant held by the application. Reference numeral 402 indicates the application resource upper-limit declaration file for declaring upper-limit values for resources used by the application. The application resource upper-limit declaration file 402 can be realized by a manifest header of a Java (registered trademark) archive file, for example. In such a case, the manifest file, that is the application resource upper-limit declaration file 402, is stored in the storage apparatus 202 or the like along with the program body of the application.

Figure 4B:
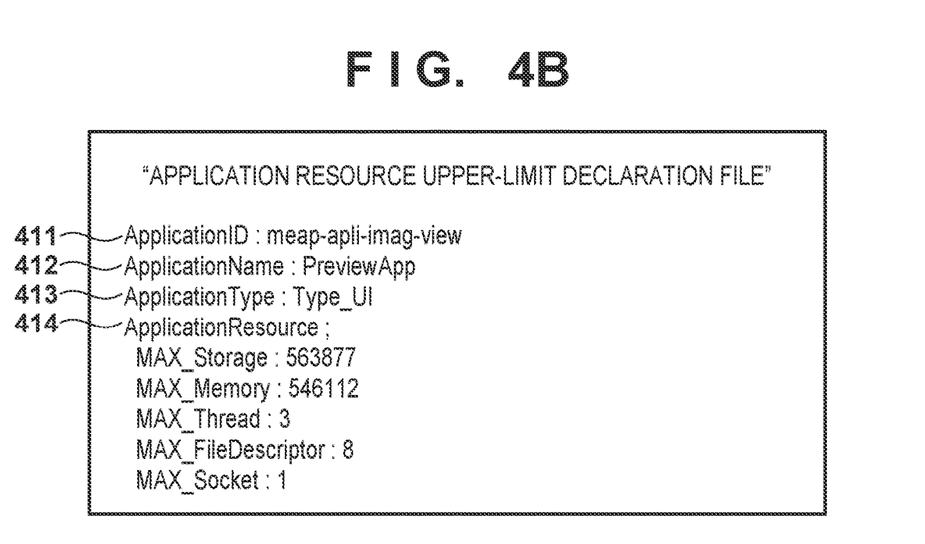

FIG. 4B is a view that illustrates an example of an internal configuration of the application resource upper-limit declaration file 402. The application resource upper-limit declaration file 402 includes application information, such as a title, an ID and a type of the application. The view illustrates an application that displays on the user interface unit 201 a preview of an image in the apparatus, as an example. An application name (ApplicationName) 412 reciting an application name "PreviewApp", and an application ID (ApplicationID) 411 reciting an application unique ID "meap-apli-image-view" are illustrated. An application type (ApplicationType) 413 indicates information of a type classified in accordance with function of the application. The "Type_UI" of the view indicates a UI type which is for displaying a screen of the application on the user interface unit 201, and accepting an input operation from a user. As types other than the UI type, there is a servlet type that displays information of an application in accordance with a user interface via a Web browser, and a service type that operates without a user interface. The application ID 411, the application name 412, and the application type 413 are together called application information.

In addition, the application resource upper-limit declaration file 402 holds upper-limit values 414 of each resource that the application uses, together with the application information. The present view illustrates an example in which an upper-limit value of each type of resource used by the application, such as sockets, file descriptors, threads, memory, and storage, is recited in accordance with a unit of bytes or a numeric value for each of the types.

Above was the data configuration and system common to the first through third embodiments. An example for each embodiment is explained below.

First Embodiment

Figure 5:
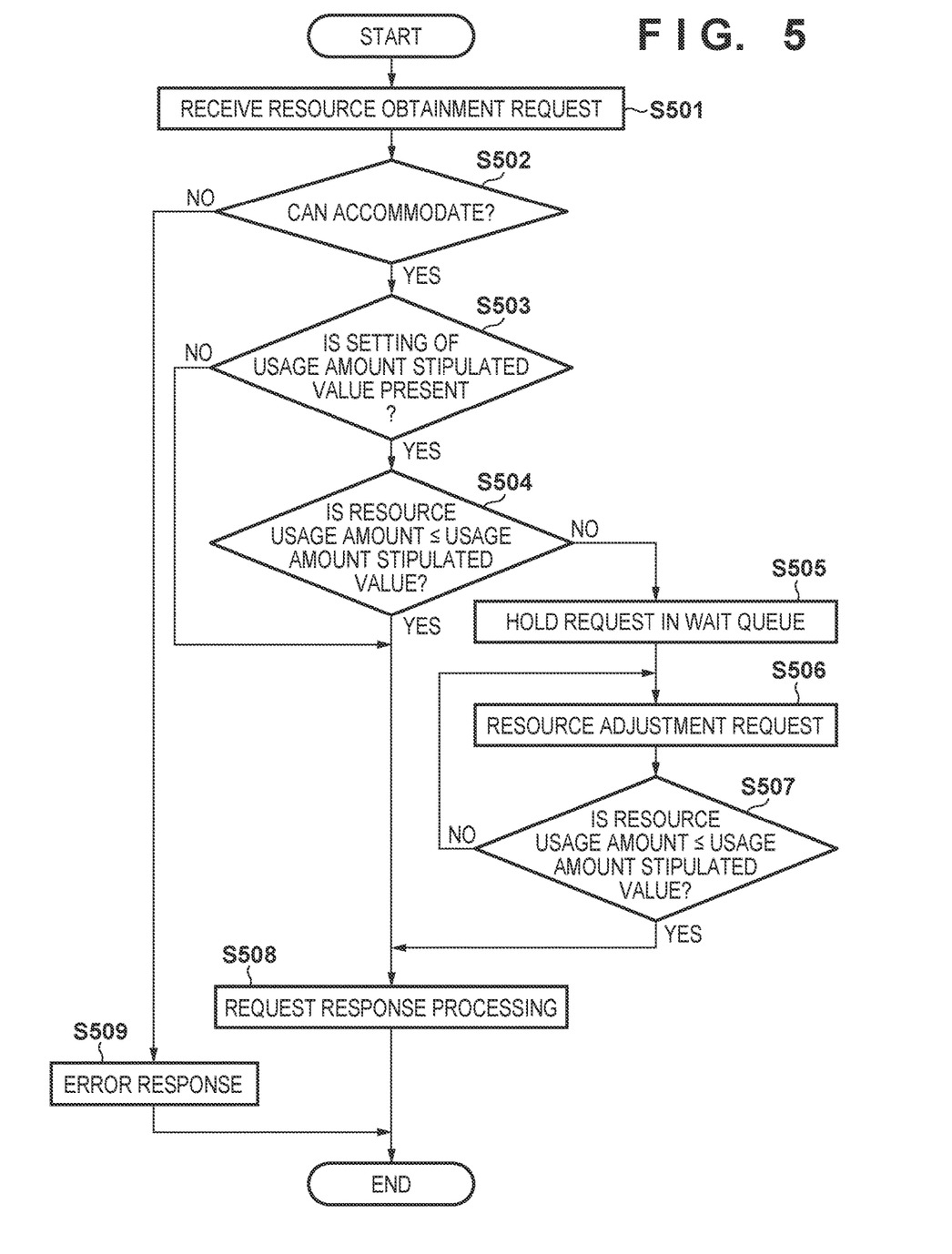
FIG. 5 is a view that illustrates an example of a processing flow of a first embodiment of the present invention.

An example of operation of the resource service of the present embodiment is explained by using the flowchart of FIG. 5. The flowchart starts from the resource service 304 receiving a resource obtainment request from an application. Note that a resource referred to in the following explanation indicates each type of resource requested. For example, a determination of whether resource allocation is possible for a resource request is performed for each type of resource request. An application can start execution if all requested resources have been allocated. A request for a resource by an application may be performed before execution thereof, or may be performed during execution when the resource has become necessary.

<Resource Allocation Processing>

Upon receiving a resource obtainment request from an application (step S501), the resource service 304 performs a resource upper-limit value determination for the application that is the sender (step S502). The resource service 304 identifies the resource obtainment request sender application from the application ID included in the resource obtainment request, reads the corresponding application resource upper-limit declaration file 402, and obtains the resource upper-limit values 414. These values are the resource amounts requested by the resource obtainment request in accordance with the resource requestor application.

The resource service 304 calculates a difference between the upper-limit value of a resource that the application can use, and a resource usage amount that the application is using of that at the time that the request was received, in other words the resource amount that can be newly allocated at the time that the request was received, and determines whether the resource amount requested by the resource obtainment request can be accommodated. The resource amount that can be newly allocated is, for example, a resource amount not allocated to an application from a total amount of resources that the resource service 304 manages. The resource service 304 updates and holds a usage amount of the resource or the resource amount that can be newly allocated each time release and allocation of the resource are performed.

Figure 6:
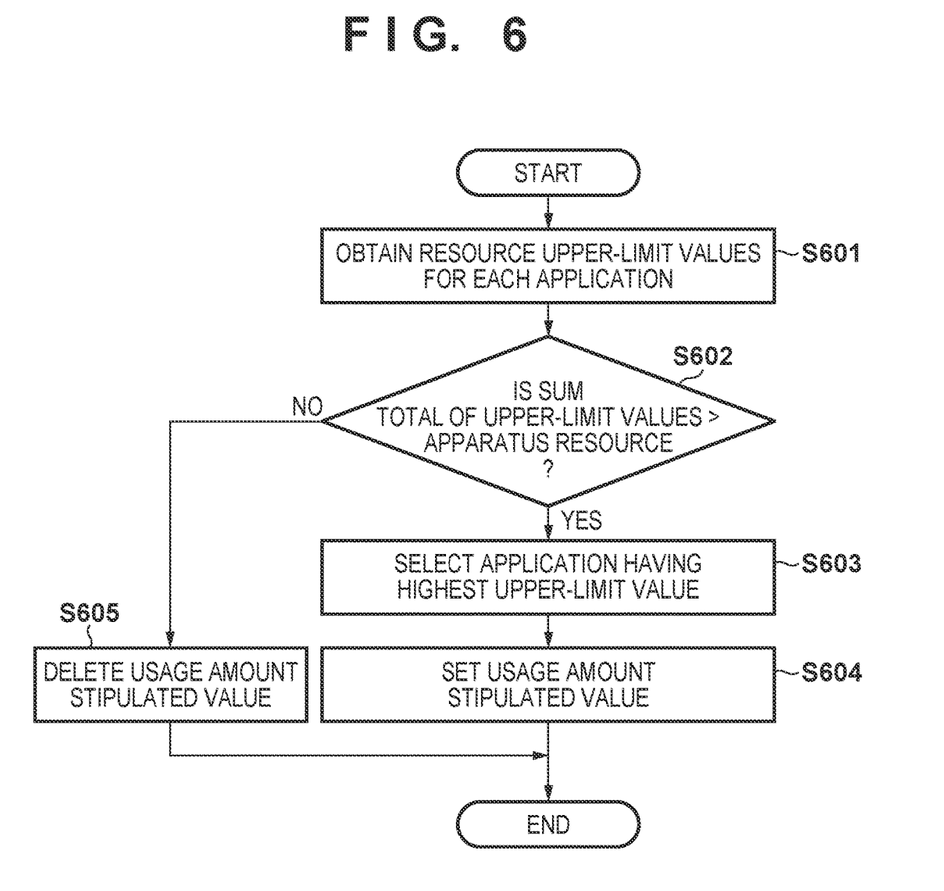
FIG. 6 is a view that illustrates an example of a processing flow for setting a usage amount stipulated value in the first embodiment of the present invention.

If the resource amount of the resource obtainment request is greater than the resource amount that can be allocated, the resource service determines that processing is impossible, returns an error response, and terminates this processing (step S509). Meanwhile, if it is determined in step S502 that the resource amount of the resource obtainment request is smaller and the resource obtainment request can be processed, the process advances to a process for determining (step S503) a usage amount stipulated value that is set in a usable region of the apparatus. Note that, in the present example, there is a branch to step S503 if the condition of step S502 is satisfied for all requested resources, and an error if there is even one type of resource for which the condition is not satisfied. The usage amount stipulated value is a value in which is set a resource usage amount at which the application can be used steadily, in relation to a total amount of resources under management of the resource service 304. It is a value that is made to be one reference when the resource service 304 performs management of resources. The usage amount stipulated value is set in a procedure of the later described FIG. 6, is a reference value for securing a margin of the resource amount that can be allocated, and is set if a sum total of upper-limit values of resources of applications that are operating exceeds the resource amount that can be allocated. A total amount of resources that the resource service 304 manages may be referred to as a second reference value, and the usage amount stipulated value as a first reference value.

In step S503, the resource service 304 determines the existence or absence of the usage amount stipulated value, and if the usage amount stipulated value is set, processing proceeds to resource usage amount determination (step S504). A case in which the usage amount stipulated value is not set, is when a total of the upper-limit values of resources for each application operating on the apparatus is smaller than the total amount of resources that the resource service 304 manages. In such a case, because it is possible to determine that behavior of the image forming apparatus 100 will not becomes unstable due to a resource deficiency, instead of performing a usage amount determination the resource service 304 performs request response processing (step S508). In other words, the requested amount of the resource is allocated to the resource requestor application.

If it is determined in step S503 that the usage amount stipulated value is set, in step S504 the resource service 304 obtains the usage amount stipulated value, and determines whether a sum total (referred to as a total resource usage amount) of the total resource amount being used by all applications that are operating and the resource amount necessary for processing of the resource obtainment request exceeds the usage amount stipulated value. If the usage amount stipulated value is determined is not exceeded, in other words if the total resource usage amount is less than or equal to the first reference value, the processing proceeds to step S508, and processing for responding to the resource obtainment request is performed. If it is determined in step S504 that the sum total exceeds the usage amount stipulated value, the resource service holds the resource obtainment request temporarily in a wait queue (step S505). Upon holding the resource obtainment request in the wait queue (step S505), the resource service 304 performs resource adjustment request processing (step S506). As resource adjustment request processing, the resource service 304 outputs a resource adjustment request to each application that operates on the apparatus (step S506). Each application that receives the resource adjustment request determines whether there is a resource that can be released, in relation to resources secured in the application. If there is a resource that can be released, the application transmits to the resource service 304, as a response to the resource adjustment request, a resource release request for the resource that can be released. Upon receiving the resource release request from the application, the resource service 304 performs release processing for the resource in the apparatus. The resource adjustment request is issued by designating a necessary resource for example, and each application that receives the resource adjustment request releases, if releasing is possible, in relation to the resource for which adjustment is requested and that is secured in the application. The application may release all of an allocated resource, or it may release a portion thereof. If releasing a portion of a resource, upon receiving the resource obtainment request the resource service 304 newly allocates the difference between the requested resource upper-limit value and the allocated resource. In addition, the resource adjustment request of step S506 may be output all at once to all operating applications, or may be output sequentially to each application. In such a case, the order of applications that are the destinations of the issuance of the resource adjustment request is decided, for example, so to make applications to which a resource of larger amount is allocated be first (i.e. preferentially), or so to have an order that is decided in advance.

After performing processing of the resource release request, the resource service 304 again determines, similarly to step S504, whether a sum total of the total resource amount being used by all applications that are operating and the resource amount necessary for processing of the resource obtainment request exceeds the usage amount stipulated value (step S507). If the result of the determination is that the resource usage amount of the application exceeds the usage amount stipulated value, the resource adjustment request processing of step S506 is returned to again. If a situation is entered in which resource adjustment request processing is repeatedly performed, and when the resource obtainment request is responded to, the usage amount stipulated value is not exceeded, the resource service 304 proceeds to the request response processing (step S508).

In step S508, the resource service 304 responds to the resource obtainment request from the application, and after securing the resource from the application execution platform, returns a response to the application, and this flowchart terminates.

<Usage Amount Stipulated Value Setting Process>

Next, the flowchart of FIG. 6 is used to give an explanation in relation to a processing flow for calculating the previously mentioned usage amount stipulated value of a resource. If there is no change to the status of an application in the apparatus, the usage amount stipulated value of a resource does not change. Therefore, this processing is performed when the resource service 304 is first activated, or if an addition/change/deletion of an application is performed.

Firstly, the resource service 304 obtains, from the application resource upper-limit declaration file 402 of each application, the resource upper-limit values 414 for each application that is in an installed and executable state (step S601). A sum total of the obtained resource upper-limit values is calculated, and it is determined whether it is greater than an allocatable resource amount that the image forming apparatus 100 has prepared as resources for applications (hereinafter, referred to as an apparatus resource amount) (step S602). If the apparatus resource amount is greater than the sum total of the resource upper-limit values of the applications, in other words if the sum total of the resource upper-limit values is less than or equal to the apparatus resource amount, the resources will not be insufficient even if all of the applications operate simultaneously. Therefore, the usage amount stipulated value is not set, and on the contrary an already set value is deleted before processing terminates (step S605).

In contrast, if the sum total of the resource upper-limit values of the applications is larger than the apparatus resource amount, the largest value from the upper-limit values of applications is obtained (step S603). A value for which it is always possible to secure the largest amount of resources, in other words a value obtained by subtracting the maximum value of the obtained resource upper-limit values from all resources in the apparatus, is set as the usage amount stipulated value of the resource (step S604), and this processing terminates. Note that all resources means everything for a particular type of resource.

With the present embodiment, the resource service 304 obtains the resource upper-limit values of the applications in the apparatus, and sets a value for which it is always possible to secure the largest upper-limit value as the usage amount stipulated value. Then it is provided to the resource service 304 that manages resources, in other words a resource management apparatus, so that a resource amount that applications use in the apparatus is kept to the usage amount stipulated value or less. By this resource management apparatus, the application can avoid causing an error when securing resources from the application execution platform 301. In particular, if the sum total of the resource upper-limit values used by applications exceeds an amount that can be allocated to applications, the resource amount that at least one application requests is secured as empty among the resources managed by the resource service 304. For this reason, it becomes possible to avoid an error when, for example, an application not using the resource service 304 directly secures resources from the application execution platform 301. Also, it is possible to secure a resource for allocating resources preferentially even for an application that uses the resource service 304. As a result, an apparatus becoming unstable due to a resource deficiency in an environment in which embedded applications are installed and executed is avoided.

Second Embodiment

As previously explained by FIG. 4A and FIG. 4B, there are several types for an application of the present embodiment. An application of the UI type uses a user interface that a user directly operates, and performs display of information and acceptance of input. Therefore, a problem in operation of an application of the UI type is considered to be a problem of the apparatus overall. To avoid such a situation, an example of resource management that preferentially processes an application of a resource service UI type is explained by using FIG. 7 and FIG. 8.

<Usage Amount Stipulated Value Setting Process>

Figure 8:
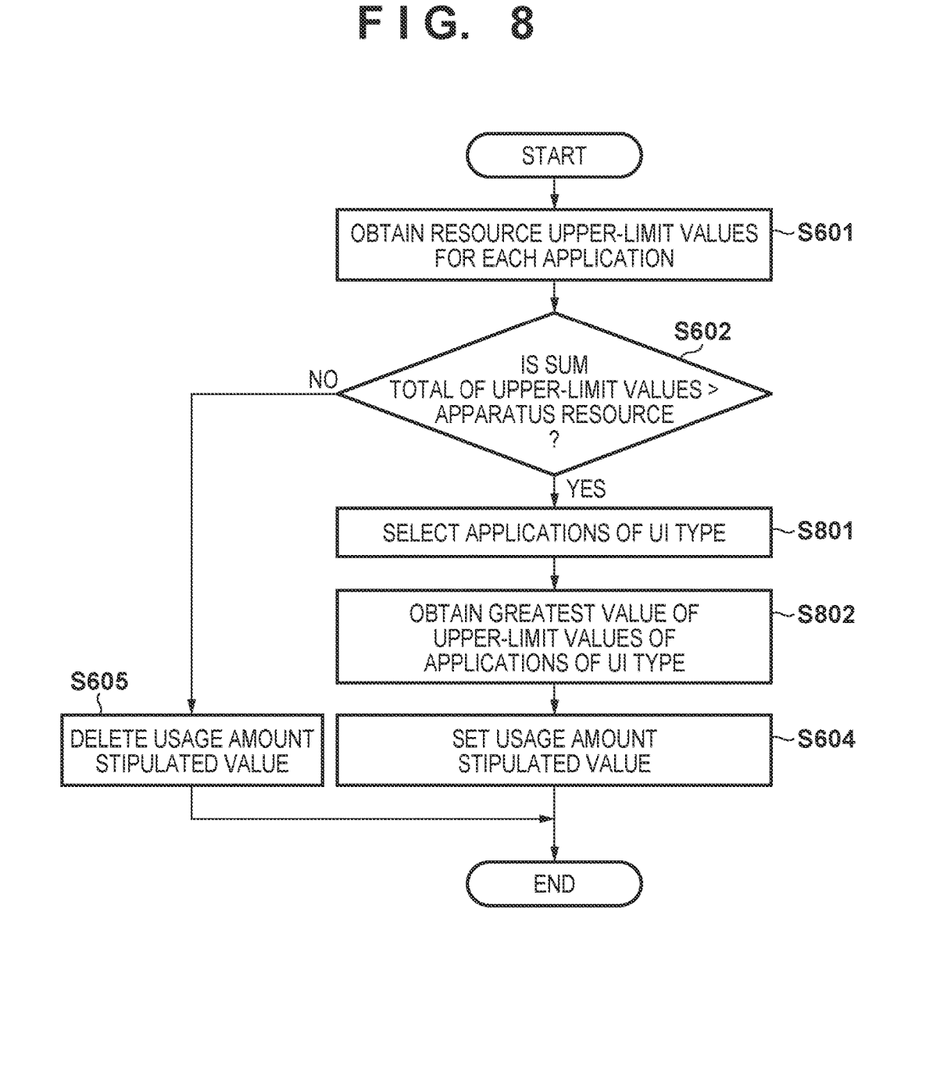
FIG. 8 is a view that illustrates an example of a processing flow for setting a usage amount stipulated value in the second embodiment of the present invention.

Firstly, the flowchart of FIG. 8 is used to give an explanation regarding a processing flow for the resource service 304 calculating the resource usage amount stipulated value. The flowchart of FIG. 8 is based on the flowchart of FIG. 6 of the first embodiment, and is the procedure used instead of the procedure of FIG. 6, so explanation of previously described steps is omitted.

If the resource service 304 determines that the sum total of the resource upper-limit values obtained in step S602 is greater than the resources in the apparatus, the processing proceeds to step S801. Applications of the UI type are selected from the applications in the apparatus (step S801), and from the resource upper-limit values of the applications of the UI type, a largest value is obtained (step S802). Then, a value for which it is always possible to secure the largest value, in other words a value obtained by subtracting the obtained resource upper-limit value from all resources in the apparatus, is set as the usage amount stipulated value of the resource (step S604), and this processing terminates.

<Resource Allocation Processing>

Figure 7:
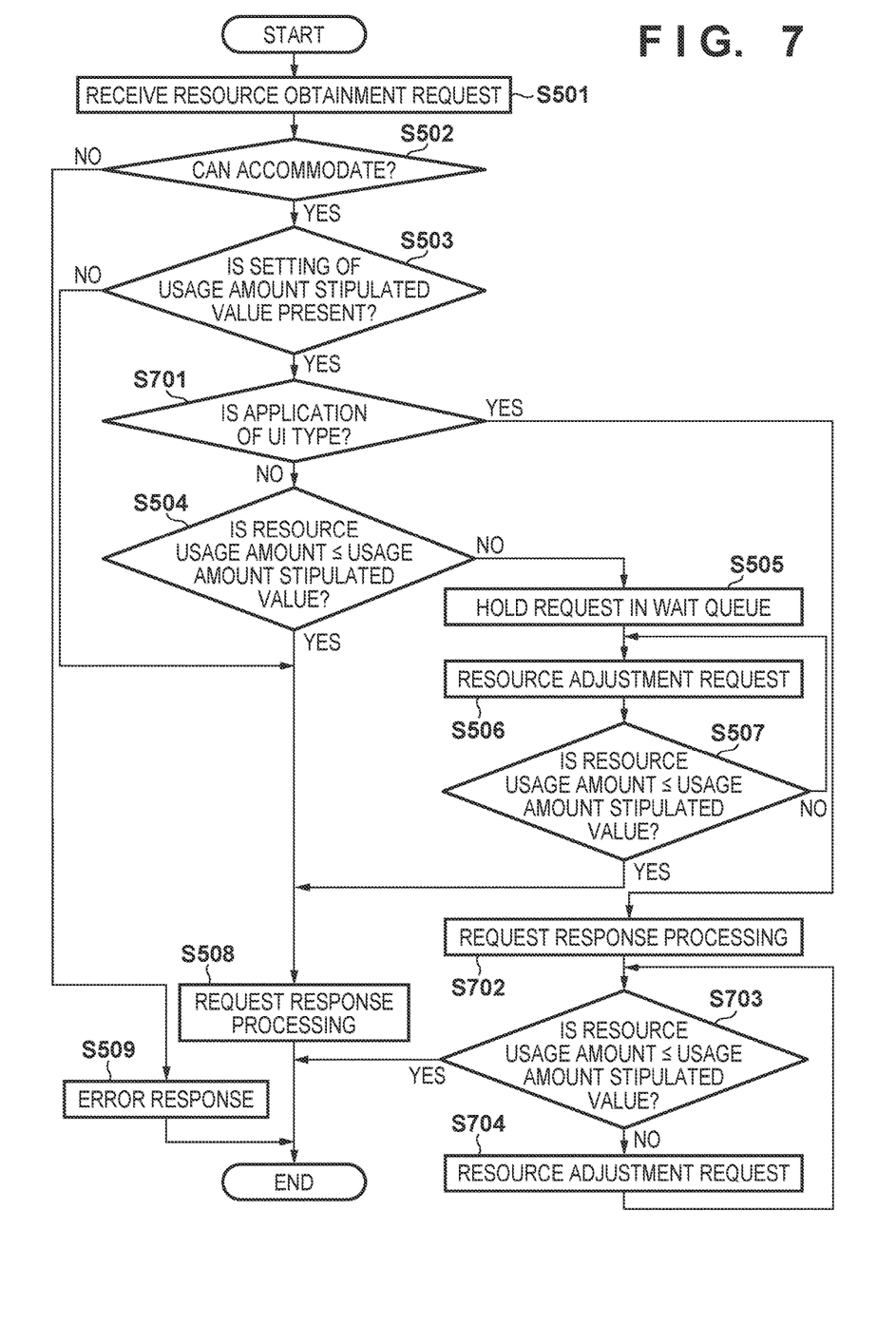
FIG. 7 is a view that illustrates an example of a processing flow of a second embodiment of the present invention.

Next, processing for when the resource service 304 performs resource management is explained by using the flowchart of FIG. 7. The flowchart starts from the resource service 304 receiving a resource obtainment request from an application (step S501). Note that the flowchart of FIG. 7 is based on the flowchart of FIG. 5, and because it is a procedure used in place of the procedure of FIG. 5, a detailed description of portions that are similar processing is omitted.

Upon receiving a resource obtainment request, the resource service 304 performs an application resource upper-limit value determination, in other words a determination of whether the resource obtainment request can be accommodated (step S502), and determines an existence or absence or a usage amount stipulated value for a resource (step S503). If the usage amount stipulated value is set, the resource service 304 identifies, from an application ID included in the resource obtainment request, a sender application of the resource obtainment request, and determines whether the sender application is of the UI type from the application type 413 of the application resource upper-limit declaration file 402 thereof (step S701). If the sender application is determined to not be of the UI type, processing proceeds to resource usage amount determination (step S504), and terminates after passing through the processing of step S505-step S508.

In contrast, if the sender application is determined to be of the UI type, the resource service 304 performs request response processing with respect to the resource obtainment request, without performing the resource usage amount determination (step S702). At this point the resource service 304 returns a response to the application, after securing resources that correspond to the resource obtainment request. After returning the response, the resource service 304 determines whether a resource amount in use in the apparatus is the usage amount stipulated value or less (step S703). If the resource amount in use in the apparatus is less than or equal to the resource usage amount stipulated value, this resource management processing terminates as is.

If, due to the request response processing of step S702, a situation is entered in which the resource amount in use in the apparatus exceeds the resource usage amount stipulation, resource adjustment request processing similar to that of step S506 is performed (step S704). After the resource release request processing is performed, step S703 is returned to again, and the in use resource amount is determined.

The present embodiment described a resource management apparatus that enables an application type of UI type to be preferentially processed. A resource obtainment request from a UI type application is preferentially processed by calculating a usage amount stipulated value for securing a resource maximum usage amount for a UI type application, and securing a resource required by a UI type application in accordance with this usage amount stipulated value. By such a resource management apparatus, an error ceases to be returned for a resource obtainment request from a UI type application. Therefore, it is possible to prevent a problem caused by a resource deficiency during UI operation by a user from occurring.

Third Embodiment

Figure 9:
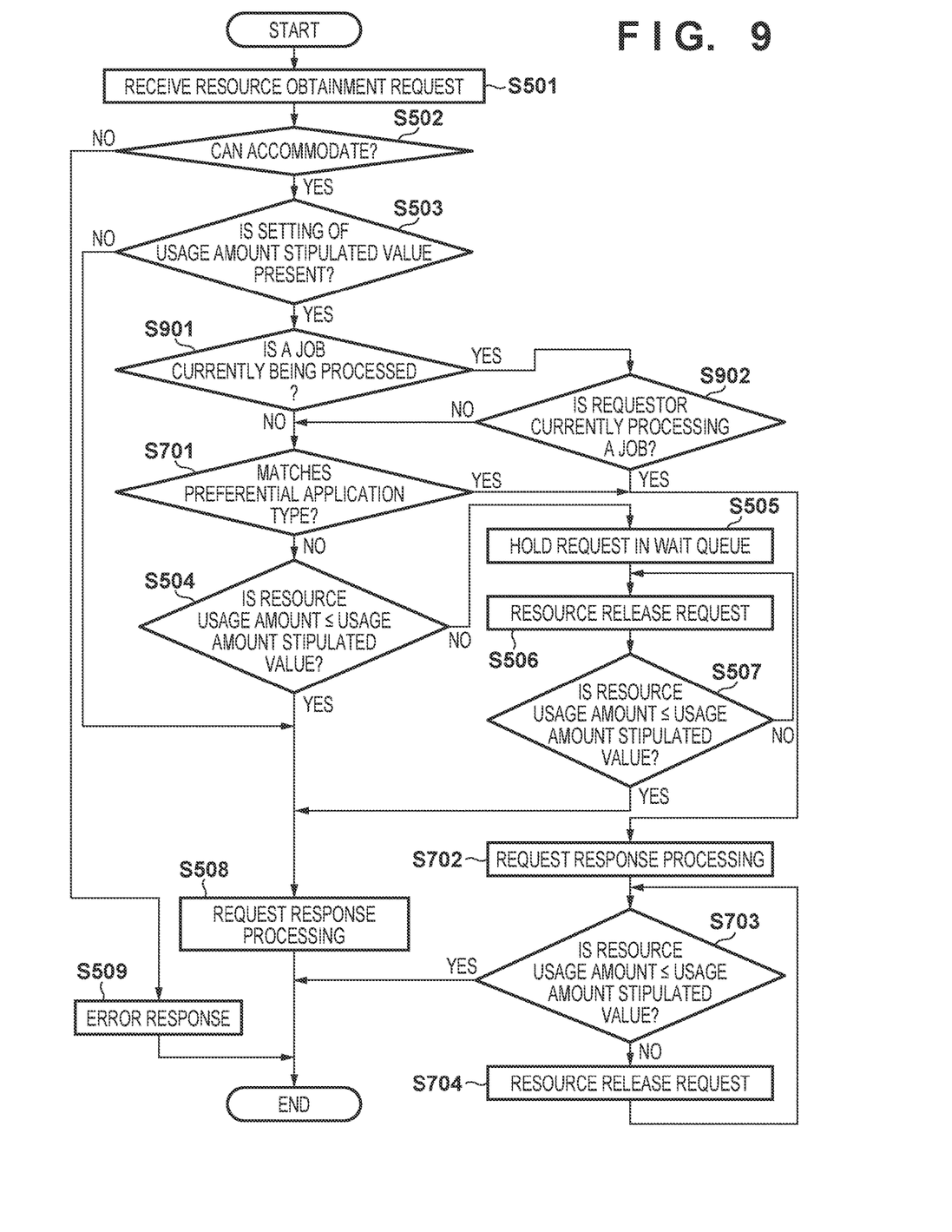
FIG. 9 is a view that illustrates an example of a processing flow of a third embodiment of the present invention.

As basic functions of an image forming apparatus, there are functions such as printing or copying. These functions are commonly processed as jobs, and executed sequentially. An example that differs depending on the resource service of the present embodiment is explained by using the flowchart of FIG. 9. In addition to the resource management processing of FIG. 7, the flowchart of FIG. 9 prioritizes a resource obtainment request during job processing. Note that, in the flowchart of FIG. 9, a detailed description of portions that perform processing similar to that of FIG. 5 and FIG. 7 is omitted. In the present embodiment, the procedure of FIG. 9 is executed in place of the procedure of FIG. 5 or FIG. 7. Note that the usage amount stipulated value may be set by the procedure of FIG. 6, for example.

<Resource Allocation Processing>

Similarly to the previously described flowchart of FIG. 7, this flowchart is started when the resource service 304 receives a resource obtainment request from an application (step S501). Upon receiving a resource obtainment request, the resource service 304 performs an application upper-limit value determination, in other words a determination of whether the resource obtainment request can be accommodated (step S502), and makes a determination as to an existence or absence or a usage amount stipulated value set in a usable region of the apparatus (step S503).

If the usage amount stipulated value is set and the value could be obtained, the resource service 304 determines whether the apparatus is currently processing a job (step S901). As described above, jobs include copying, scanning, printing, or the like, for example. A job may include ancillary processing, such as transmission or reception of data, storage of data, and reading of data. In step S901, the resource service 304 obtains, through the support library 303, operation states of the scanner unit 204, the printer unit 205, and the finisher unit 206, which are connected to the core unit 200. If in a state in which the scanner unit 204, the printer unit 205, and the finisher unit 206 are not operating, the resource service 304 determines that a job is not currently being processed, and the processing proceeds to step S701. Because processing after step S701 is similar to that of the second embodiment of FIG. 7, explanation is omitted. If in a state in which the scanner unit 204, the printer unit 205, and the finisher unit 206 are operating, it is determined that a job is currently being processed, and the processing proceeds to step S902. Note that in FIG. 9, step S701 does not determine for the UI type only, but determines whether there is a correspondence to a predetermined prioritized application type, for example. Of course, if the prioritized application type is the UI type, the determination of this step is the same determination as step S701 of FIG. 7. If there is a correspondence, the processing branches to step S702. Note that, if prioritizing only lobs that are being executed, configuration may be taken to skip step S701 and branch to step S504.

The resource service 304 makes a query with respect to the sender application of the resource obtainment request as to whether a processing request was passed to any hardware unit among the scanner unit 204, the printer unit 205, and the finisher unit 206. If, in accordance with a response from the application, it is determined that a processing request is being performed, the sender application of the resource obtainment request determines that a job is being processed, and performs request response processing (step S702). From here until step S704 is as explained in FIG. 7.

In the present embodiment, the image forming apparatus 100 is a resource management apparatus that determines whether a job is currently being processed, and preferentially processes a resource obtainment request from an application that is processing a job. By this processing, it is possible to provide a resource management apparatus that causes processing for basic functions, such as printing or copying, to operate without stopping.

Note that the UI type application in the second embodiment and the application for which a job is currently being executed in the third embodiment can be said to be applications having high priority and having a high necessity to advance processing without delay. Accordingly, if a high priority application, which is not limited to such applications, requests a resource, it is possible to allocate to the application a resource secured by arranging the usage amount stipulated value. Therefore, for an application having a high priority, it is possible to prevent delay in processing caused by a resource deficiency.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-145251, filed Jul. 22, 2015 which is hereby incorporated by reference herein in its entirety.

What is claimed is:

1. A resource management apparatus for managing resources used by a plurality of applications, the apparatus comprising:
  a memory storing instructions; and
  at least one processor that, upon executing instructions stored in the memory, performs the functions of
    an obtaining unit configured to obtain upper-limit values of resource usage amounts of applications in an executable state;
    a receiving unit configured to receive a resource obtainment request from a requesting application; and
    an allocation unit configured to:
      determine whether or not the requesting application is a UI (user interface) type application that involves a user interface;
      if the requesting application is determined to be the UI type application,
        allocate a requested resource to the requesting application in response to the resource obtainment request regardless of a resource usage amount, and
        perform resource adjustment after allocating the requested resource, if the resource usage amount is larger than the upper limit value of resource usage amount;
      if the requesting application is determined not to be the UI type application,
        perform resource adjustment after entering the resource obtainment request in a queue until the resource usage amount is smaller than or equal to the upper limit value of resource usage amount, if the resource usage amount is larger than the upper limit value of resource usage amount; and
      allocate the requested resource to the requesting application in response to a resource obtainment request entered in the queue, if the resource usage amount is smaller than or equal to the upper limit value of resource usage amount.

2. The resource management apparatus according to claim 1,
further comprising a setting unit configured to set the upper limit value,
wherein, when a sum total of upper-limit values of resource amounts of applications in an executable state exceeds a resource amount that can be allocated to applications, the setting unit sets as the upper-limit value a value determined by subtracting the highest upper limit value among the obtained upper limit values from the sum total of the obtained upper-limit values of the resource amounts of applications in the executable state.

3. The resource management apparatus according to claim 2, wherein, when a sum total of upper-limit values of resource usage amounts of applications in an executable state exceeds a resource amount that can be allocated to applications, the setting unit does not set the reference value, and
the allocation unit allocates the requested resource to the requesting application in response to the resource obtainment request.

4. The resource management apparatus according to claim 1, wherein the resource includes a socket, a thread, and a memory.

5. An image forming apparatus capable of executing a plurality of applications, the apparatus comprising:
a memory storing instructions; and
at least one processor that, upon executing instructions stored in the memory, performs the functions of
an obtaining unit configured to obtain upper-limit values of resource usage amounts of applications in executable state;
a receiving unit configured to receive a resource obtainment request from a requesting application; and
an allocation unit configured to:
determine whether or not the requesting application is a UI (user interface) type application that involves a user interface;
if the requesting application is determined to be the UI type application,
allocate a requested resource to the requesting application in response to the resource obtainment request regardless of a resource usage amount, and
perform resource adjustment after allocating the requested resource, if the resource usage amount is larger than the upper limit value of resource usage amount;
if the requesting application is determined not to be the UI type application,
perform resource adjustment after entering the resource obtainment request in a queue until the resource usage amount is smaller than or equal to the upper limit value of resource usage amount, if the resource usage amount is larger than the upper limit value of resource usage amount; and
allocate the requested resource to the requesting application in to a resource obtainment request entered in the queue, if the resource usage amount is smaller than or equal to the upper limit value of resource usage amount; and
a unit configured to execute the application, which uses the resource allocated by the allocation unit.

6. A resource management method for managing resources used by a plurality of applications, the method being performed by at least one processor and comprising:
obtaining, by the at least one processor, upper-limit values of resource usage amounts of applications in executable state;
receiving a resource obtainment request from a requesting application;
determining whether or not the requesting application is a UI (user interface) type application that involves a user interface;
if the requesting application is determined to be the UI type application,
allocating a requested resource to the requesting application in response to the resource obtainment request regardless of a resource usage amount, and
performing resource adjustment after allocating the requested resource, if the resource usage amount is larger than the upper limit value of resource usage among;
if the requesting application is determined not to be the UI type application,
performing resource adjustment after entering the resource obtainment request in a queue until the resource usage amount is smaller than or equal to the upper limit value of resource usage amount, if the resource usage amount is larger than the upper limit value of resource usage amount;
allocating, by the at least one processor, the requested resource to the requesting application in response to a resource obtainment request entered in the queue, if the resource usage amount is smaller than or equal to the upper limit value of resource usage amount.

7. A non-transitory computer-readable medium that has recorded thereon a program for causing a management of resources used by a plurality of applications, the program causing a computer to execute:
obtaining, by the at least one processor, upper-limit values of resource usage amounts of applications in executable state;
receiving a resource obtainment request from a requesting application;
determining whether or not the requesting application is a UI (user interface) type application that involves a user interface;
if the requesting application is determined to be the UI type application,
allocating a requested resource to the requesting application in response to the resource obtainment request regardless of a resource usage amount, and
performing resource adjustment after allocating the requested resource, if the resource usage amount is larger than the upper limit value of resource usage among;
if the requesting application is determined not to be the UI type application,
performing resource adjustment after entering the resource obtainment request in a queue until the resource usage amount is smaller than or equal to the upper limit value of resource usage amount, if the resource usage amount is larger than the upper limit value of resource usage amount;
allocating, by the at least one processor, the requested resource to the requesting application in response to a resource obtainment request entered in the queue, if the resource usage amount is smaller than or equal to the upper limit value of resource usage amount.

\* \* \* \* \*